Figure 1:
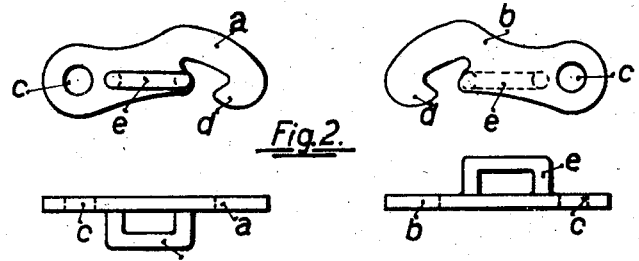

Sept. 28, 1926.

H. WAGNER

VEHICLE COUPLING

Filed June 29, 1926

1,601,385

Inventor:
Heinrich Wagner
By
Attorney

Patented Sept. 28, 1926.

1,601,385

UNITED STATES PATENT OFFICE.

HEINRICH WAGNER, OF RECKLINGHAUSEN, GERMANY.

VEHICLE COUPLING.

Application filed June 29, 1926, Serial No. 119,493, and in Germany March 23, 1925.

My invention relates to couplings for vehicles and it is an object of my invention to eliminate certain drawbacks of the existing couplings. To this end, I provide a double coupling, i. e., a coupling comprising two pairs of coupling parts, one of which pairs will remain operative when the other pair fails, and I so design my novel coupling that the two points where such pairs of parts engage, are at liberty to be displaced vertically in a substantially straight line, and the two points where the couplings are attached to their respective vehicles, are at liberty to be displaced horizontally, also in a substantially straight line, and due to the flexibility thus imparted, my novel coupling may yield to irregularities of the track and to shocks without the shackles becoming disconnected, and the shackles may be lowered when two vehicles are pushed together, and reassume their normal horizontal position when a tractive force acts on them.

Couplings as heretofore constructed have only one pair of coupling parts and will separate if such pair fails. They will also become uncoupled when the vehicles are pushed together or when the level of the track is subject to, however slight, variations.

In the drawings I have illustrated several couplings embodying my invention.

Figure 7:
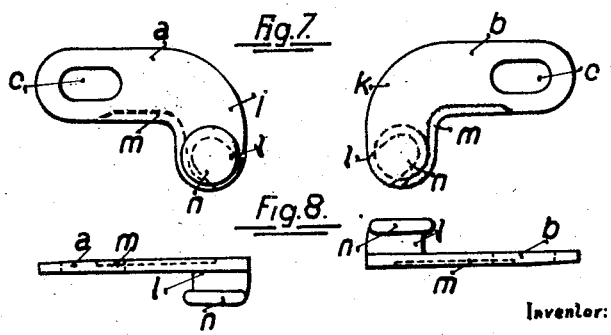

The several figures are alternately elevations and plan views of the modifications illustrated. More particularly, Figs. 1 and 2 illustrate a coupling having a hook-and-loop connection, Figs. 3 to 6 illustrate two forms of a coupling having a hook-and-pin connection, Figs. 7 and 8 illustrate a coupling having a pin of particular construction which combines the functions of a hook and a pin.

In all figures $a$ and $b$ are the coupling shackles which are identical and may therefore be manufactured in quantity, but are arranged symmetrically in respect to each other, and $c$ is the hole for the swivel or other part, not shown, on which the shanks are fulcrumed.

Referring first to Figs. 1 and 2, each shackle $a$ and $b$ is equipped with a pointed hook $d$ and a loop $e$, each hook being adapted to engage the loop of the opposite shackle. To this end, the loops are arranged on opposite faces of the shackles.

Referring to Figs. 3 to 6, the shackles $a$ and $b$ have flanged pins $f$ on opposite faces which are adapted to be engaged by the hooks of the shackles.

Figure 3:
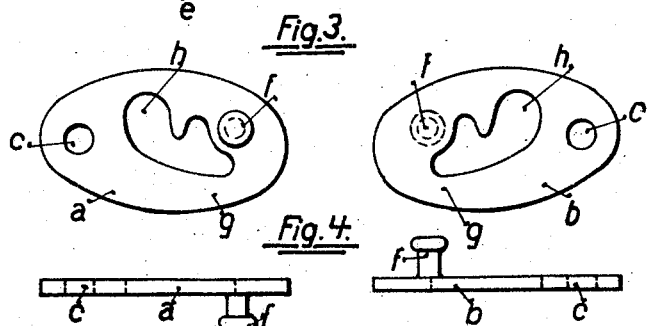

In the coupling illustrated in Figs. 3 and 4, the end of each hook is connected with the body of its shank by a bar or bridge $g$ so that the shackle defines a closed eye $h$. This coupling is particularly suitable for very rough roads where collision with obstacles is likely to occur, as the shanks cannot be thrown apart by such collision.

Figure 5:
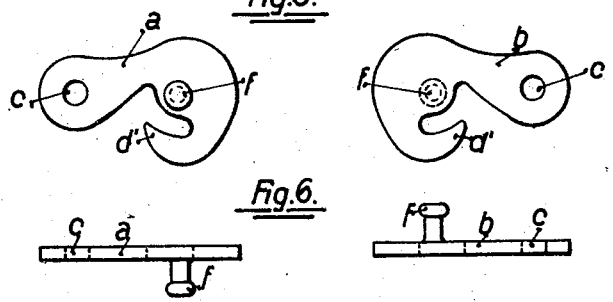

In the coupling illustrated in Figs. 5 and 6, the pins $f$ are again provided but the hooks $d'$ are open at the ends as in Figs. 1 and 2.

Referring now to Figs. 7 and 8, the mating ends of the shackles $a$ and $b$ are deflected downwardly at $i$ and $k$, and a flanged pin $l$ is formed at each deflected end on opposite sides of the shackles. The flange $n$ of each pin $l$ is adapted to engage a recess $m$ in the mating shackle so that when the two shackles are connected the pins $l$ will engage and the flanges will be concealed in the recesses $m$.

A coupling of the kind described could not perform its functions properly notwithstanding the duplication of its coupling parts were it not endowed with the required degree of flexibility. In my novel coupling, the points where the shackles are connected with each other and with the vehicles, are not in a rigid system but may yield to shocks without deformation or failure of any of its parts. Its flexibility also prevents separation of the shackles when the vehicles are pushed together or the track is irregular but it does not interfere with the regular operation of the coupling which may be performed by a simple handle.

The condition that the points where the shackles are engaged and where they are pivoted to the vehicles, should be free to move in substantially straight vertical and horizontal lines, respectively, is fulfilled in all modifications illustrated.

I claim:

1. A vehicle coupling comprising a pair of pivoted shackles, each shackle having an engaging member and an engaged member, the engaging member of one shackle joining with the engaged member of the other shackle and the engaging member of the last-named shackle joining the engaged member of the other shackle to permit displacement of the coupling in substantially straight vertical and horizontal lines.

2. A vehicle coupling comprising a pair of pivoted shackles, each shackle having a hook and an engaged member, the hook of one shackle engaging the engaged member of the other shackle and the hook of the last-named shackle engaging the engaged member of the other shackle to permit displacement of the coupling in substantially straight vertical and horizontal lines.

3. A vehicle coupling comprising a pair of pivoted shackles, each shackle having a hook and a pin, the hook of one shackle engaging the pin of the other shackle and the hook of the last-named shackle engaging the pin of the other shackle to permit displacement of the coupling in substantially straight vertical and horizontal lines.

4. A vehicle coupling comprising a pair of shackles, each shackle being pivotally connected to a vehicle, a hook and a retaining pin adapted to be engaged by the mating hook formed on each shackle, said hooks and pins being so made as to permit them to be displaced in a substantially straight vertical line, and said pivotal connection being so made as to permit said shackles to be displaced in a substantially straight horizontal line.

5. A vehicle coupling comprising a pair of shackles, each shackle being pivotally connected to a vehicle, a hook and a flanged pin adapted to be engaged by the mating hook formed on each shackle, said hooks and pins being so made as to permit them to be displaced in a substantially straight vertical line, and said pivotal connection being so made as to permit said shackles to be displaced in a substantially straight horizontal line.

In testimony whereof I affix my signature.

HEINRICH WAGNER.